(12) United States Patent
Gheorghe

(10) Patent No.: US 7,360,676 B2
(45) Date of Patent: Apr. 22, 2008

(54) WELDED ALUMINUM ALLOY STRUCTURE

(75) Inventor: Iulian Gheorghe, Canton, GA (US)

(73) Assignee: Universal Alloy Corporation, Canton, GA (US)

( * ) Notice: Subject to any disclaimer, the term of this patent is extended or adjusted under 35 U.S.C. 154(b) by 394 days.

(21) Appl. No.: 10/662,836

(22) Filed: Sep. 15, 2003

(65) Prior Publication Data

US 2004/0056075 A1    Mar. 25, 2004

Related U.S. Application Data

(60) Provisional application No. 60/412,201, filed on Sep. 21, 2002.

(51) Int. Cl.
*B23K 20/12* (2006.01)

(52) U.S. Cl. .................. 228/112.1; 228/233.2

(58) Field of Classification Search ...................... None
See application file for complete search history.

(56) References Cited

U.S. PATENT DOCUMENTS

| | | | |
|---|---|---|---|
| 3,649,227 A * | 3/1972 | Fetzer et al. ................ | 428/636 |
| 4,082,578 A * | 4/1978 | Evancho et al. ............. | 148/535 |
| 4,589,932 A * | 5/1986 | Park ........................... | 148/690 |
| 5,248,077 A | 9/1993 | Rhoades et al. .......... | 228/112.1 |
| 5,460,317 A | 10/1995 | Thomas et al. .......... | 228/112.1 |
| 5,462,712 A * | 10/1995 | Langan et al. ............. | 420/528 |
| 5,507,888 A | 4/1996 | Dickson, Jr. et al. ....... | 148/690 |
| 5,897,047 A | 4/1999 | Takei et al. ................. | 228/114 |
| 6,168,067 B1 * | 1/2001 | Waldron et al. .......... | 228/112.1 |
| 6,333,484 B1 | 12/2001 | Foster et al. ............ | 219/121.64 |
| 6,972,110 B2 * | 12/2005 | Chakrabarti et al. ........ | 420/532 |
| 2005/0006010 A1 * | 1/2005 | Benedictus et al. ......... | 148/552 |
| 2006/0083654 A1 * | 4/2006 | Chakrabarti et al. ........ | 420/532 |

FOREIGN PATENT DOCUMENTS

| JP | 2002307173 A | * 10/2002 |
|---|---|---|
| WO | WO 98/45080 | 10/1998 |

* cited by examiner

*Primary Examiner*—Kiley Stoner
(74) *Attorney, Agent, or Firm*—Andrew Alexander

(57) ABSTRACT

A method of welding age-hardenable aluminum alloys to improve strength properties in the heat affected zone and the weld zone, the method comprising the steps of providing precipitation hardenable aluminum alloy members to be welded and subjecting said members to a first aging step for times and temperatures to generated strengthening precipitates. Thereafter, the aged members are welded to provide a welded assembly having a weld zone. The welded members are subjected to a second aging step to reprecipitate strengthening precipitates dissolved in the weld zone.

20 Claims, 2 Drawing Sheets

WELDED ALUMINUM ALLOY STRUCTURE

CROSS REFERENCE TO RELATED APPLICATION

This application claims the benefit of U.S. Provisional Application No. 60/412,201, filed Sep. 21, 2002, incorporated herein by reference.

BACKGROUND OF THE INVENTION

This invention relates to welded aluminum alloy members and more particularly it relates to a method for improving weld strength in the weld zone and the heat affected zone of the weld.

Welding aluminum alloys normally involves generation or application of heat to melt or plasticize the aluminum alloy members being welded. Welding has a detrimental effect on the properties of alloy members being joined by decreasing strength in the weld and in the zone adjacent the weld referred to herein as the heat affected zone. This is particularly true for the precipitation hardened or strengthened alloys referred to by the Aluminum Association alloys such as the AA2xxx, AA6xxx and AA7xxx alloy series. In these alloys, heat generated during welding is high enough to dissolve precipitation strengthening phases such as $MgZn_2$ ($\eta$-phase), $Mg_5Al_3$, $Mg_3Zn_3Al_2$ (T-phase), $Mg_4Zn_7Al$, $Al_2Cu$, $Mg(Al, Cu, Zn)_2$, $CuMgAl_2$ (S-phase), $LiAl$, $LiMgAl_2$ and $Al_3Li$, depending on the alloy. After the welding process, the phases start to naturally re-precipitate at a very slow rate and the re-precipitation can last for ten or fifteen years, resulting in an unstable weld. Such welds also exhibit poor corrosion resistance.

Welding is also detrimental in the adjacent heat affected zone because of the heat generated during the welding procedure. That is, the temperatures in the heat affected zone are lower than in the weld but are sufficiently high to cause precipitation and coarsening of these phases. This results in overaging in the heat affected zone and a reduction in strength. Thus, the forming of the weld results in a decrease in strength and corrosion properties in the structure.

Past attempts at solving the problem of decreased strength included increasing the thickness of the metal in the weld zone. However, this has the problem of adding more weight which is undesirable for aircraft use. Further, increased thickness did not solve the problem of instability of the weld and did not prevent overaging in the heat affected zone.

These problems arise with different welding techniques such as friction welding, friction stir welding or laser welding. In friction welding, relative movement of the parts to be welded is employed to generate heat for joining. In friction stir welding, a rotating non-consumable tool is used to generate heat in the members to be joined. Laser welding employs a laser beam to melt a small area of each of the parts to be joined. In these welding techniques, the stirred or melted portion flows together and solidifies to provide a welded structure.

It can be seen that there is a great need for a method of welding which eliminates or minimizes these problems to produce a weld and heat affected zone having improved properties.

Different approaches have been used in an attempt to solve these problems. For example, U.S. Pat. No. 6,168,067 discloses a method for reducing material property degradation during friction stir welding. More specifically, the method includes the steps of solution heat treating first and second structural members at a first predetermined temperature schedule. The first and second structural members are then quenched to a predetermined temperature at which the structural members are in a non-equilibrium state and have an incomplete temper. The first structural member is then positioned adjacent to the second structural member, thereby defining an interface therebetween. Thereafter, the first and second structural members are joined to form a structural assembly by friction stir welding the material along the interface prior to precipitation heat treating the structural assembly. The structural assembly is then aged, such as by precipitation heat treating, at a second predetermined temperature schedule to stabilize the material properties of the resulting structural assembly, thereby completing the temper of the material. The method requires fewer manufacturing steps than conventional techniques for friction stir weld precipitation-hardened parent materials. In addition, the method minimizes the degradation of the material properties during friction stir welding, and produces a structural assembly with improved strength, hardness, and corrosion resistance, as well as dimensional quality.

U.S. Pat. No. 5,248,077 discloses that friction welding is preformed by linear or non-rotating orbital motion in which both parts to be joined by friction welding are moved in identical paths, out of phase to produce friction until welding temperature is attained, and then in phase, with the parts registered in alignment, during the bonding phase. Because the registered, in phase control of the mechanism is attainable with great certainty and rapidity, friction welding with a far higher precision and accuracy of alignment is attained. The high precision and accuracy of the technique permits application of friction welding to fabrication of parts, such as turbine engines, not usually made by such techniques. A preferred apparatus for practice of the invention involves an opposed pair of orbital tables on which parts to be joined are mounted and fixed in place by mounts. The parts are aligned and registered and drives then cause the parts to orbit while they are pressed together by pressure means, until friction heats the joint surfaces to welding temperatures.

U.S. Pat. No. 5,507,888 discloses methods for making an aluminum alloy bicycle frame and for making tubes for such frames including use of an aluminum alloy containing about 0.5 to 1.3% magnesium, about 0.4 to 1.2% silicon, and about 0.6 to 1.2% copper and preferred practices for making extruded and drawn tubing of the alloy and making bicycle frames from the tubing. The preferred practices include extrusion temperature control and other aspects of extrusion and drawing. The tubes are welded by MIG or TIG welding procedures.

U.S. Pat. No. 5,897,047 discloses a method of connecting an aluminum part with a steel part using a friction welding technique. The aluminum part is heat treated such as T6 treatment to raise its hardness. After that, the aluminum part is friction welded to the steel part. The steel part may also be heat treated to lower its hardness instead of or in addition to hardening of the aluminum part. A third part which has an intermediate hardness may be placed between the aluminum part and the steel part, and the aluminum part may be coupled with the steel part via the third part.

U.S. Pat. No. 6,333,484 discloses a process for welding a nickel or cobalt based superalloy article to minimize cracking by preheating the entire weld area to a maximum ductility temperature range, maintaining such temperature during welding and solidification of the weld, raising the temperature for stress relief of the superalloy, then cooling at a rate effective to minimize gamma prime precipitation.

PCT Application WO 98/45080 discloses a friction stir welding method according to which the workpieces to be welded are positioned on a work-table and by means of clamping means clamped to one another and/or to the work-table during the welding. A rotating welding means is arranged to move along a joint between the workpieces while being pressed against said workpieces during the welding. Additional heat is supplied to the joint prior to and/or during the welding operation, in excess of the frictional heat generated in the joint from the rotation of the welding means and of any other heat that may be supplied to the joint in any other manner by the welding means. The invention likewise concerns an apparatus for friction stir welding, comprising a heating element for supply of additional heat to the joint prior to and/or during the welding operation, in excess of the frictional heat generated in the joint from the rotation of the welding means and of any other heat that may be supplied to the joint in any other manner by the welding means.

The present invention provides an improved welded assembly and provides a novel process for welding of precipitation strengthened aluminum alloys having improved weld strength as well as improved strength in the heat affected zone adjacent the weld. Also, the novel process results in improved corrosion properties in the weld and heat affected zone.

SUMMARY OF THE INVENTION

It is an object of the invention to provide an improved welded aluminum alloy assembly.

It is another object of this invention to provide improved welded precipitation strengthened aluminum alloy members.

Yet, it is another object of this invention to provide a method for welding precipitation strengthened aluminum alloy to provide for improved strength in the weld and in the heat affected zone surrounding the weld.

Still, it is another object of the invention to provide an improved method for welding AA2xxx, AA6xxx and AA7xxx type alloys to provide for improved strength in the weld and in the heat affected zone surrounding the weld.

And yet, it is another object of the invention to provide an improved method for welding precipitation strengthened aluminum alloy members using friction welding, friction stir welding or laser beam welding.

These and other objects will become apparent from the specification, drawings and claims appended hereto.

In accordance with these objects, there is provided a method of welding age-hardenable or precipitation strengthenable aluminum alloys to improve properties in the heat affected zone and the weld zone, the method comprising the steps of providing precipitation strengthenable aluminum alloy members to be welded and, prior to welding, subjecting the members to a first aging step for times and temperatures sufficient to generate GP zones and coherent η' precipitates. Thereafter, the aged members are welded to provide a welded assembly having a weld zone and a heat affected zone. Then, the welded assembly is subjected to a second aging step to reprecipitate GP zones and η' precipitates dissolved in the weld zone. The second aging step is carried out for a time and temperature sufficient to provide the welded member in a T6 condition, for example.

The first aging treatment can range for 0.25 to 24 hours in a temperature range of about 200° to 300° F. to generate a significant number of GP zones (Gunier Preston zones) and coherent η' ($MgZn_2$) precipitates, for example, in the $AA_7xxx$ type alloys. It has been discovered that the higher the density of GP zones and η' coherent precipitates, the less likely the material in the heat affected zone will be subject to overaging. That is, aging prior to welding in accordance with the invention minimizes the effect of heat on the heat affected zone. Thus, it will be seen that the first aging step creates GP zones and coherent η' precipitates to prevent or minimize the overaging process in the heat affected zone which can occur as a result of welding.

After the second or first post-weld aging step, the welded member can be subject to further aging steps to the final temper such as T73, T74, T76 or T77 tempers. For example, the welded structure can be subject to a second post-weld aging step to provide the T73, T74, or T76 condition or a third post-weld aging step can be employed to provide the T77 condition. The T73, T74, T76, or T77 tempers applies to wrought products that are artificially aged after solution heat treatment to carry them beyond a point of maximum strength to provide control of some other significant characteristic. For this purpose, other characteristic is something other than mechanical properties, for example exfoliation corrosion or stress corrosion cracking. These tempers are composed of typically two or more aging steps, for example two or three steps. In the case of a two-step aging process that is characteristic of T73, T74, and T76 tempers the first aging step is carried out at a temperature below the temperature of the second aging step. For example the first aging step may be carried out at temperatures between 200° F. and 300° F. for times ranging from a few minutes to 24 hours or more. The second aging step may be carried out at temperatures between 300° F. and 360° F. or even 400° F. for times ranging from a few seconds or minutes to 6 or more hours. In case of T77 type tempers the abovementioned aging steps may be followed by a low temperature step that may be carried out at temperatures between 200° F. and 300° F. for times ranging from a few minutes to 24 hours or more.

DETAILED DESCRIPTION OF PREFERRED EMBODIMENTS

Figure 1:
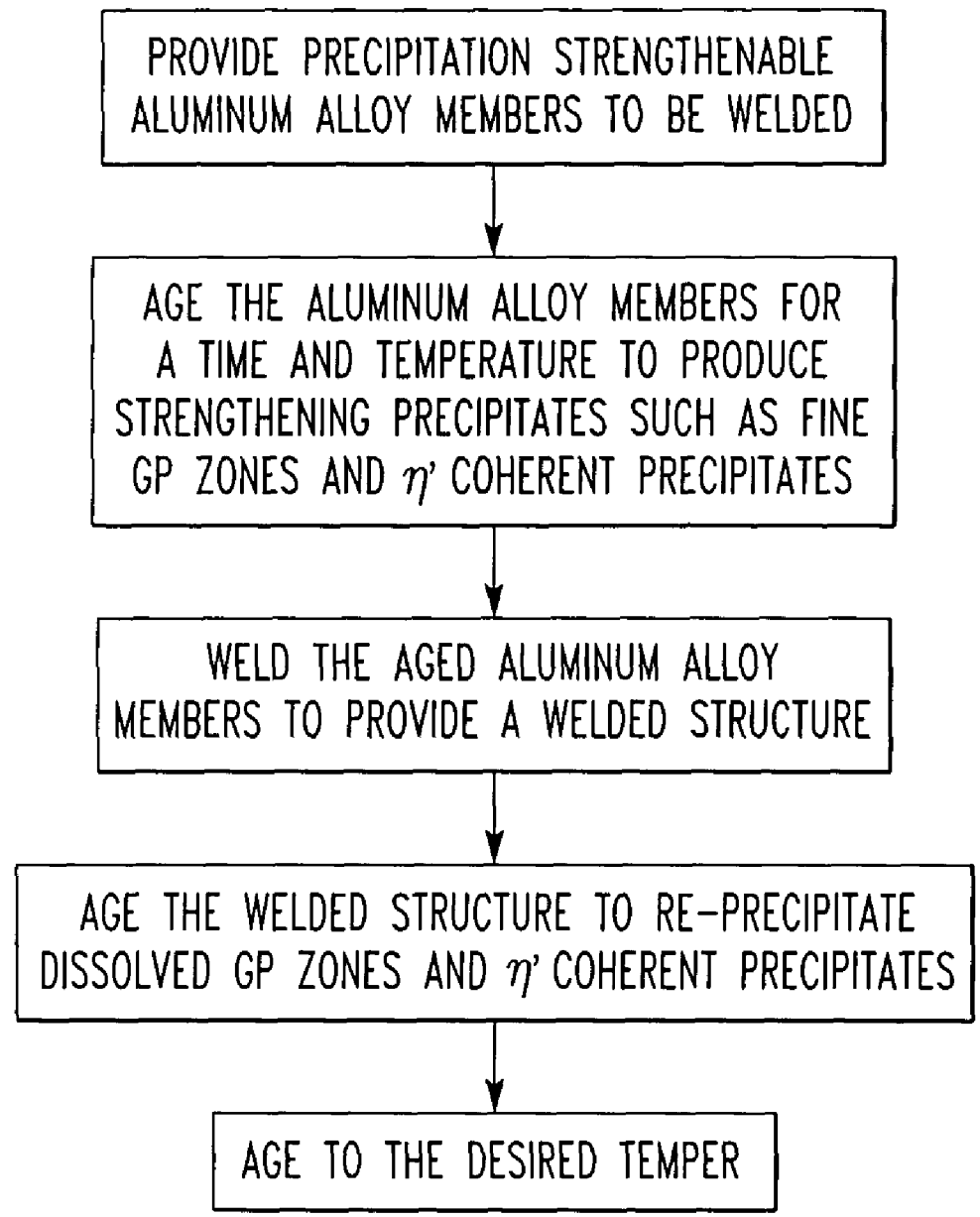
FIG. 1 is a flow chart illustrating steps of the invention.

Referring to FIG. 1, there is shown a sequence of steps that may be used in the invention. The alloys for which the invention is designed are precipitation hardenable or strengthening alloys which develop strength through heat treatments at temperatures above room temperatures for controlled periods of time depending on the alloy and the properties desired. Precipitation hardenable aluminum alloys to which the invention has application includes the AA2xxx, AA6xxx and AA7xxx type alloys as well as some lithium-containing alloys. Examples of the 2xxx alloys are 2024, 2014, 2026, 2224, 2097, 2297, 2397, 2293, 2219, 2094, 2098 and 2095 and examples of the 6xxx alloys are 6061, 6013, 6056 and 6082. Examples of the 7xxx series alloys are 7075, 7050, 7150, 7250, 7055, 7068, 7249, 7349 and 7449. The composition ranges for these alloys are set forth by The Aluminum Association in a publication entitled "Designation and Chemical Composition Limits for Aluminum Alloys in the Form of Castings and Ingots", dated January 1996, incorporated herein by reference as if specifically set forth.

The alloy members to be aged and welded in accordance with the invention are usually in the solution heat treated and quenched condition.

The alloy members can be solution heat treated by heating to a temperature range of about 840° to 900° F., which in the case of AA7xxx alloys, takes substantially all of the soluble zinc, magnesium and copper into solution. After subjecting the members to one or more temperatures in this range, the members should be quenched or cooled rapidly. This may be accomplished by spraying or immersing in cold water or using cold air. The alloy members may be cold worked, e.g., stretched to relieve internal stresses or otherwise shaped into the desired configuration for welding. Thus, the product, with or without, cold work but in the solution heat treated condition, is in condition for treating or aging in accordance with the invention.

Figure 2:
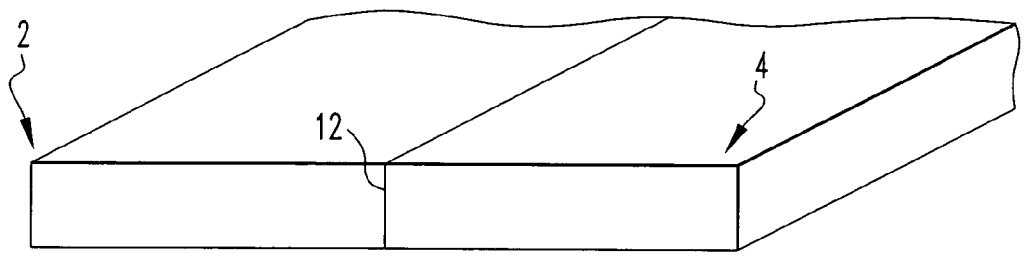
FIG. 2 is a cross-sectional view showing the two members to be joined.

The alloy members to which the invention can be applied can be derived from sheet, plate, or extrusion, for example, and the plate can be derived from ingot and the extrusion derived from billet. The alloy members to which the invention can be applied can also be derived from castings. FIG. 2 shows two aluminum alloy members 2 and 4 arranged in a side-by-side or butt-joint configuration to provide a seam or interface 12 therebetween for welding. In another configuration, the aluminum alloy members may be arranged or placed on top of one another to provide for a lap joint, where friction stir welding can be used.

Figure 3:
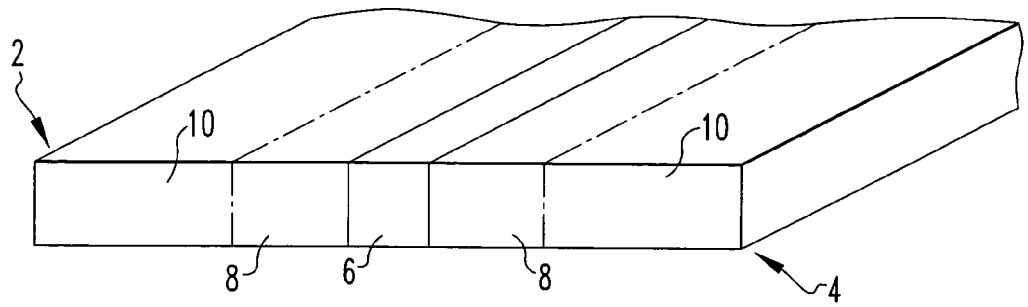
FIG. 3 is a cross-sectional view showing a weld or weld zone and a heat affected zone of the welded structure.

Referring to FIG. 3, it will be seen that after welding members 2 and 4, there results three zones in the welded structure. Zone 6 is the weld zone where the metal in the two members are flowed together to join the two members together. On both sides of weld zone 6, there is a heat affected zone 8 in which the heat from welding affects the properties in zone 8. Outside of the heat affected zone is parent metal 10 which is generally unaffected by the heat from the welding process. These zones exist whether laser, friction, or friction stir welding is employed.

In laser welding, a laser beam is used to melt a small area of each part to be joined. The melted parts flow together before solidifying to join the parts together to form structural assemblies.

Friction stir welding refers to a method of joining aluminum members together. In friction stir welding, a probe is inserted against or between a pair of opposing faces of members to be joined. Then, the probe is rotated. The rotation of the probe creates friction sufficient to generate heat to plasticize material at the opposing faces without melting the material. This results in a weld joint forming as the plasticized portions flow together and solidify to form the weld zone. Friction stir welding is described in U.S. Pat. No. 5,460,317, incorporated herein by reference.

Friction welding refers to a method of joining aluminum members together by moving one of the members relative to the other while urging the pieces together. This generates heat and plasticized portions without melting. The plasticized portions flow together and join to form the weld zone.

TIG refers to welding utilizing a tungsten inert gas process. In TIG welding, an electric arc is conducted between a tungsten or non-consumed electrode and the work pieces. At the same time, filler metal is fed into the weld site.

MIG refers to metal inert gas wherein a consumable aluminum electrode is fed into the work site. Known welding alloys include AA4043 and AA4643.

The pre-weld aging step of the invention is designed to prepare the microstructure of aluminum members to be welded for the welding process and to minimize the effect of heat generated during welding on the heat affected zone by reducing the rate at which the heat affected zone material can overage.

Prior to welding, the alloy members are subjected to a first treatment, phase or step to condition the metal for welding. As noted, the alloy members to be welded are subject to an artificial aging treatment for a time and temperature to produce or generate strengthening precipitates such as GP zones and coherent η' precipitate ($MgZn_2$). GP zones are clusters of atoms, for example, copper, magnesium and zinc in the 7xxx series. The greater the density of GP zones and η' coherent precipitates, the less likely the alloy in the heat affected zone will be overaged during the welding process.

The first aging or pre-weld treatment for AlZnMgCu alloys includes subjecting the members to be welded to a temperature range of 100° to 300° F., preferably 200° to 300° F. for a time period in the range of 0.25 to 24 hours. The object of this treatment is to obtain a large density of precipitates having very small size. As noted, such precipitates include the GP zones and the η' phases. A preferred size of GP zone is in the range of 2 to 3.5 nm and a preferred density of $4 \times 10^{18}$-$5 \times 10^{18}$ zones per $cm^3$ Thus, the first aging step is designed to create a large population of GP zones and coherent η' precipitates, which in turn minimizes or prevents overaging occurring in the heat affected zone. For example, if incubation time for incoherent η' precipitates to form is greater than the time the heat affected zone is exposed to temperatures above 315° F. then averaging in the heat affected zone is prevented or significantly reduced. Incoherent η' precipitates are larger in size than coherent η' precipitates and have lost the coherency with the matrix.

The AA6xxx series aluminum alloys can be subject to pre-weld aging treatment which includes subjecting the members to be welded to a temperature in the range of 300 to 420° F. for a time period in the range of 3 to 24 hours which results in the formation of $Mg_2Si$ precipitates. Similarly, the AA2xxx series aluminum alloys can be subject to a pre-weld aging treatment which includes a temperature in the range of 320 to 380° F. for a time period of 6 to 24 hours which results in the formation of $CuAl_2$ precipitates.

After the aging step, aluminum alloy members 2 and 4 to be welded (FIG. 2) are placed tightly against each other to provide an interface 12 for welding. If friction stir welding is employed, the members may be firmly secured to prevent movement during the welding process. If friction welding is employed, then each member must be separately secured to provide relative movement suited to friction welding. Similarly, if laser beam welding is employed, the members are secured to provide the appropriate interface for welding. Thereafter, members 2 and 4 are joined by welding along interface 12 to provide a welded structure as shown in FIG. 3. As noted earlier, welding along interface 12 results in a weld zone 6 and two heat affected zones 8. During the welding process, precipitates generated during the pre-weld aging treatment are dissolved in the weld zone.

Thus, it is necessary to improve the properties and stabilize the weld zone by once again developing the precipitates in the weld zone. That is, in the case of AA7xxx or AlZnMgCu alloys, it is necessary to re-precipitate the GP zones and η' precipitates that were dissolved in the weld zone. This both stabilizes the weld zone against further natural aging and prepares the microstructure for further strengthening steps.

In accordance with the invention, the welded structure is subject to a post-weld aging treatment to re-precipitate GP zones and coherent η' precipitates to improve the strength of the weld zone by precipitation strengthening. In the case of AA7xxx or AlZnMgCu alloys, this is achieved by artificially aging the welded structure above room temperature for a period of time to develop the precipitates in the weld zone. This may be achieved by subjecting the welded structure to a temperature range of 100° to 300° F. for a period of 0.25 to 24 hours. A preferred temperature range is 230° to 270° F. This post-weld aging treatment will provide the welded structure in a T6 temper or condition or slightly underaged. A T6 temper is generally obtained by subjecting a structure to a temperature range of 100° to 300° F., preferably from 230° to 270° F. for a period of 18 to 24 hours. It is believed that the first post-weld aging treatment does not significantly affect the condition of the heat affected zone or the parent metal. Further, it is believed that incoherent η precipitates do not form below about 315° F. Thus, over-aging in the heat affected zone is very limited or it does not occur at all. Accordingly, the properties of the heat affected zone are very little affected or do not deteriorate at all.

In the T6 or slightly underaged condition, the welded assembly has high or peak strength. However, such tempers can be subject to corrosion such as stress corrosion cracking. Thus, to improve corrosion, the welded assembly can be subjected to a second post-welding aging treatment. The second post-weld aging step is a controlled over-aging treatment wherein GP zones and η' precipitates are transformed into incoherent η precipitates or phases. Other precipitated phases that may form include $Mg_5Al_3$, $Mg_3Zn_3Al_2$ (T-phase), $Mg_4Zn_7Al$, $Al_2Cu$, $Mg(Al,Cu,Zn)_2$, $CuMgAl_2$ (S-phase), LiAl, $LiMgAl_2$, $Al_3Li$. The second post welding treatment includes subjecting the welded assembly to a temperature range of 300° to 500° F., preferably 300° to 380° F. for time periods in the range of a few seconds, e.g., 35 seconds to 24 hours, depending on the temperature and the temper desired. It will be appreciated that different tempers can be obtained within these times and temperatures. Thus, T73, T74 or T76 condition can be obtained by applying the second aging step. The T7 condition improves corrosion resistance, e.g., stress corrosion cracking, but can result in decreased strength.

The T73 temper includes an aging treatment in a temperature range of about 200° F. to 300° F. for 0.25 to 24 hours followed by a second aging treatment in a temperature range of about 325° F. to 360° F. for times ranging from a few seconds to 6 or more hours. The T74 temper includes an aging treatment in a temperature range of about 200° F. to 300° F. for 0.25 to 24 hours followed by a second aging step carried out in a temperature range of about 300° F. to 340° F. for a few seconds to 6 or more hours. The T76 temper includes an aging treatment in a temperature range of about 200° F. to 300° F. for 0.25 to 24 hours followed by a second aging step carried out in a temperature range of about 300° F. to 340° F. for a few seconds or minutes to 6 hours or more.

When it is desired to improve both strength and corrosion resistance, the welded assembly is subjected to a third aging step. Thus, the welded assembly is subjected to a three-step post-welding thermal treatment. That is, after welding, the welded structure is subjected to aging steps or phases which includes a low-high-low temperature aging sequence, referred to as a T77 condition. The first and second post-weld aging treatments can be as described above. The third post-weld aging step includes exposure of the welded assembly to a temperature above room temperature for a period sufficient to improve strength. Thus, the third thermal treatment can include subjecting the welded structure to a temperature range of 175° to 325° F. for about 2 to 30 hours.

A preferred thermal treatment includes subjecting the welded assembly to a temperature range of 200° to 300° F. for one or more hours, preferably about 2 to 24 hours.

This process of thermal treating and welding has the advantage that substantially the same temper or properties are obtained in the parent metal as in the heat affected zone. Further, substantially improved strength properties are obtained in the weld zone. Thus, the strength properties and corrosion properties of the weld zone and heat affected zone are substantially improved.

Welded assemblies treated in accordance with the invention are particularly suitable for aerospace applications and finds many uses in large aircrafts such as commercial and military aircrafts. The welded assemblies can be used in wing components, tail assemblies, fuselage sections or in subassemblies or other components comprising the aircraft. That is, the aircraft assemblies can comprise a wing assembly or wing subassembly, a center wing box assembly or subassembly, floor assembly or subassembly including seat tracks, floor beams, stanchions, cargo deck assemblies and subassemblies, floor panels, cargo floor panels, fuselage assemblies or subassemblies, fuselage frames, fuselage stringers and the like. Further, the welded assemblies can be utilized to join plate, extrusions, forgings, and casting for example.

Welded assemblies can be comprised of same alloys, e.g., 7249 welded to 7249 or different alloys 7075 welded to 7055, or even alloys from different series, for example, 2xxx welded to 6xxx, or 2xxx welded to 7xxx, or 6xxx welded to 7xxx.

The ranges provided herein are intended to include all the numbers within the range as if specifically set forth.

The following example is still further illustrative of the invention.

EXAMPLE

Two aluminum alloy members comprised of AA7249 in solution heat treated and quenched condition were artificially aged to the T76 condition or temper by heating to temperatures of 250° F. for 12 to 24 hours followed by 310° to 330° F. for 5 to 8 hours. The members were found to have an ultimate tensile strength of 86 ksi, a yield strength of 78 ksi and an elongation of 12%. The members were then friction stir welded. The welded structure was found to have an ultimate tensile strength of 66.8 ksi, a yield strength of 55.7 ksi and an elongation of 2.2%. Another two aluminum alloy members comprised of AA7249 alloy in solution heat treated and aged condition were treated in accordance with the invention. The two members were initially aged at 250° F. for 12 hours and then friction stir welded. The welded members were then aged at a temperature of 250° F. for 12 hours immediately followed by 310° to 330° F. for 5 to 8 hours and tested for properties. It was found that the ultimate tensile strength was 73.6 ksi, yield strength of 63.8 ksi and an elongation of 3.2%. Thus, it will be seen that the post-weld aging significantly increased the strength properties.

Having described the presently preferred embodiments, it is to be understood that the invention may be otherwise embodied within the scope of the appended claims.

What is claimed is:

1. A method of welding age-hardenable aluminum alloy to improve strength properties in a heat affected zone and a weld zone, the method comprising the steps of:
   (a) providing precipitation hardenable 7000 series aluminum alloy members to be welded;

(b) subjecting said members to a first aging step for times and temperatures to generate GP zones and coherent η' strengthening precipitates to provide aged members;

(c) friction stir welding said aged members to provide a welded assembly having a weld zone; and (d) subjecting said welded assembly to a second aging step to reprecipitate strengthening GP zones and coherent η' precipitates dissolved in the weld zone during the welding step, the second aging step being in the range of 100°-300° F. for 0.25 to 24 hours.

2. The method in accordance with claim 1 wherein said second aging step includes aging said weld assembly to a T76 temper.

3. The method in accordance with claim 1 wherein said second aging step includes aging said weld assembly to a T73 temper.

4. The method in accordance with claim 1 wherein said second aging step includes aging said weld assembly to a T74 temper.

5. The method in accordance with claim 1 wherein said second aging step includes aging said weld assembly to a T77 temper.

6. The method in accordance with claim 1 including subjecting said welded assembly to a third aging step to improve corrosion properties of said welded member.

7. The method in accordance with claim 5 including subjecting said welded assembly to three post-weld aging treatments wherein said second post weld aging treatment includes aging said welded assembly in a temperature range of 300° to 500° F. for 0.25 to 24 hours and wherein said third treatment includes aging said welded assembly in the range of 175° to 325° F. for 2 to 30 hours.

8. The method in accordance with claim 7 wherein said third treatment includes aging in the range of 200° to 300° F.

9. The method in accordance with claim 1 wherein said aluminum alloy is an alloy selected from the group consisting of AA7075, AA7050, AA7150, AA7055, AA7068, AA7249, AA7349 and AA7449.

10. A method of welding an age-hardenable aluminum alloy to improve properties in the heat affected zone and weld zone, the method comprising the steps of:

(a) providing AA7xxx precipitation hardenable aluminum alloy members to be welded;

(b) subjecting said members to a first aging step to provide GP zones and coherent θ' strengthening precipitates to provide aged members;

(c) friction stir welding said aged members to provide a welded assembly having a heat affected zone and a weld zone; and (d) after welding, subjecting said welded assembly to a post welding aging treatment or treatments to provide said welded assembly in a temper selected from the group consisting of T6, T73, T74, T76 and T77 tempers.

11. The method in accordance with claim 10 wherein said T6 temper includes an aging treatment in a temperature range of 100° to 300° F. for 0.25 to 24 hours.

12. The method in accordance with claim 10 wherein said T73 temper includes an aging treatment in a temperature range of 200° to 300° F. for 0.25 to 24 hours followed by a second aging step carried out at temperatures between 325° F. and 360° F. for times ranging from a few seconds or minutes to 6 or more hours.

13. The method in accordance with claim 10 wherein said T74 temper includes an aging treatment in a temperature range of 200° to 300° F. for 0.25 to 24 hours followed by a second aging step carried out at temperatures between 335° F. and 360° F. for times ranging from a few minutes to 6 or more hours.

14. The method in accordance with claim 10 wherein said T76 temper includes an aging treatment in a temperature range of 200° to 300° F. for 0.25 to 24 hours followed by a second aging step carried out at temperatures between 300° F. and 340° F. for times ranging from a few seconds or minutes to 6 or more hours.

15. The method in accordance with claim 10 wherein said T77 temper includes:

(a) aging said welded assembly in a temperature range of 100° to 300° F. for 0.25 to 24 hours, followed by (b) subjecting said welded assembly in a temperature range of 300° to 500° F. for 0.25 to 24 hours followed by (c) treating said welded assembly in a temperature range of 200° to 300° F. for 0.25 to 24 hours.

16. The method in accordance with claim 10 wherein said aluminum alloy is an alloy selected from the group consisting of AA7075, AA7050, AA7150, AA7055, AA7068, AA7249, AA7349 and AA7449.

17. A method of welding age-hardenable aluminum alloy to improve strength properties in a heat affected zone and a weld zone, the method comprising the steps of:

(a) providing precipitation hardenable aluminum alloy members to be welded, the alloy members fabricated from an alloy selected from the group consisting of AA7075, AA7050, AA7150, AA7055, AA7068, AA7249, AA7349 and AA7449;

(b) subjecting said members to an aging step in a temperature range of 175° to 300° F. for one or more hours to generate GP zones and coherent η' strengthening precipitates to provide aged members;

(c) friction stir welding said aged members to provide a welded assembly having a weld zone; and (d) subjecting said welded assembly to a temperature range of 200° to 300° F. for 0.25 to 24 hours, then (e) treating said welded assembly in a temperature range of 300° to 500° F. for 0.25 or more hours, and then (f) exposing said welded assembly to a temperature range of 175° to 325° F. for one or more hours.

18. A method of welding age-hardenable aluminum alloy to improve strength properties in a heat affected zone and a weld zone, the method comprising the steps of:

(a) providing precipitation hardenable 7000 series aluminum alloy members to be welded;

(b) subjecting said members to a first aging step for times and temperatures to generate GP zones and coherent η' strengthening precipitates to provide aged members;

(c) friction stir welding said aged members to provide a welded assembly having a weld zone; and (d) subjecting said welded assembly to a second aging step to reprecipitate strengthening GP zones and coherent η' precipitates dissolved in the weld zone during the welding step; and (e) after said second aging step, subjecting said welded assembly to a third aging step to improve corrosion properties of said welded member.

19. The method in accordance with claim 18 including subjecting said welded assembly to three post-weld aging treatments wherein said second post weld aging treatment includes aging said welded assembly in a temperature range of 300° to 500° F. for 0.25 to 24 hours and wherein said third treatment includes aging said welded assembly in the range of 175° to 325° F. for 2 to 30 hours.

20. The method in accordance with claim 18 wherein said third treatment includes aging in the range of 200° to 300° F.

* * * * *